E. C. ROSE.
COOKING UTENSIL.
APPLICATION FILED JULY 20, 1908.
923,445.
Patented June 1, 1909.
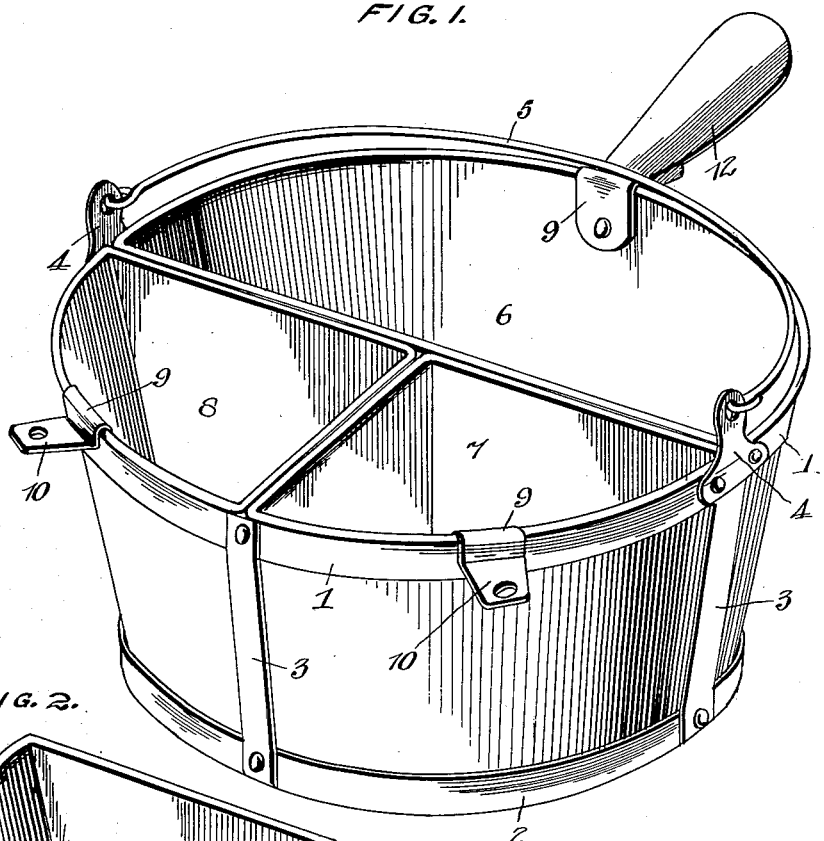
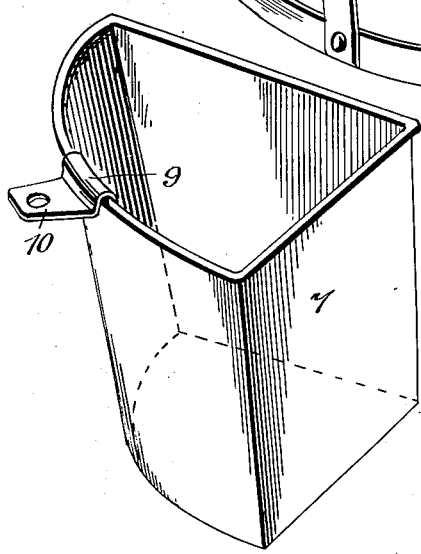
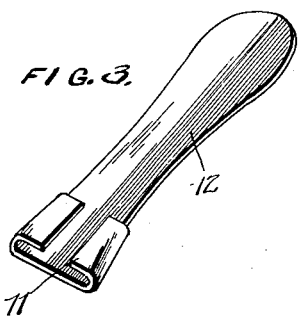
WITNESSES
Elmer C. Rose
INVENTOR
Attorney

UNITED STATES PATENT OFFICE.

ELMER C. ROSE, OF DEFIANCE, OHIO.

COOKING UTENSIL.

No. 923,445.  Specification of Letters Patent.  Patented June 1, 1909.

Application filed July 20, 1908. Serial No. 444,390.

*To all whom it may concern:*

Be it known that I, ELMER C. ROSE, citizen of the United States, residing at Defiance, in the county of Defiance and State of Ohio, have invented certain new and useful Improvements in Cooking Utensils, of which the following is a specification.

My invention relates to cooking utensils of that character embodying a series of independent cooking vessels or receptacles, and the object thereof is to provide a cheap and simplified structure, and one which will enable the utensil and the independent vessels thereof, to be more quickly and conveniently handled.

In the accompanying drawings, forming a part of this specification in which like numerals are used to designate like parts throughout the several figures, Figure 1 is a perspective view of my improved cooking utensil in the assembled position. Fig. 2 is a similar view of one of the quarter circular vessels or receptacles, removed, and Fig. 3 is a perspective view of the removable handle for engagement with, and handling, either of the sectional vessels or receptacles.

In the practical embodiment of my invention, I provide a supporting frame comprising upper and lower circular metallic strips 1 and 2, spaced apart by transverse metallic strips 3 extending between and connected at their ends to said strips 1 and 2. The upper circular strip 1 is further provided with upstanding apertured brackets 4, secured thereto at diametrically opposite points and adapted for the reception of the hooked end of a bail 5, for handling said supporting frame.

Mounted within the supporting frame 1, are a plurality of sectional vessels or receptacles which for convenience of handling and usage, I preferably give the shapes shown in the accompanying drawing, the vessel or receptacle 6 being semi-circular in shape and the vessels 7 and 8 being quarter-circular in shape to make up a complete circle for maintenance within the supporting frame 1, described. Each of the vessels or receptacles 6, 7 and 8 is provided upon its upper curved edge, with clips 9, curved downwardly and outwardly therefrom to extend over the upper circular frame strip, and provided with angular extension pieces 10, upon any one of which may be inserted the socket end 11 of removable handle 12 shown particularly in Fig. 3. Thus, the independent vessels or receptacles are firmly held within the skeleton supporting frame, the utensil as a whole, being readily and conveniently handled by means of the frame bail 5, and the said independent vessels or receptacles being readily and conveniently inserted within, removed from, or otherwise handled with respect to their supporting frame by means of their clip extensions, and the removable handle 12.

Having fully described my invention, I claim:

1. In a cooking utensil, the combination with a skeleton supporting frame comprising circular strips spaced apart by transverse strips connected to said circular strips, of a plurality of receptacles, mounted within said frame, each of said receptacles having an outwardly flanged upper edge and a clip bent downwardly over said flanged edge and forwardly therefrom at substantially right angles, the apex of said clip being adapted to engage the periphery of the upper circular strip of said skeleton frame, whereby the flanged edge of each of said utensils is retained upon said upper circular strip and each of said utensils prevented from sagging, substantially as described.

2. In a cooking utensil, the combination with a skeleton supporting frame comprising circular strips spaced apart by transverse strips connected to said circular strips, and a bail secured to one of said circular strips for handling said frame, of a plurality of receptacles mounted within said frame, each of said receptacles having an outwardly flanged upper edge and a clip bent downwardly over said flanged edge and forwardly therefrom at substantially right angles, a removable handle provided with a socket at one extremity and a gripping portion adjacent the other extremity, said socket being adapted to contain the forward portion of said clip, whereby each of said utensils may be readily removed from said frame.

In testimony whereof I affix my signature in presence of two witnesses.

ELMER C. ROSE.

Witnesses:
 AARON BERRENGER,
 HENRY C. ROSE.